United States Patent

Umeda et al.

[11] Patent Number: 5,082,078
[45] Date of Patent: Jan. 21, 1992

[54] STRUCTURE OF A FRONT BODY OF A MOTOR VEHICLE AND A METHOD OF ASSEMBLING A VEHICLE BODY

[75] Inventors: Takashi Umeda; Norihiro Kanemitsu; Kousuke Murakami; Kuniaki Takahara; Ushio Sakurai, all of Hiroshima, Japan

[73] Assignee: Mazda Motor Corporation, Japan

[21] Appl. No.: 632,769

[22] Filed: Dec. 21, 1990

[30] Foreign Application Priority Data

Dec. 21, 1989 [JP] Japan .................................. 1-333138
Feb. 19, 1990 [JP] Japan .................................. 2-39220
Mar. 12, 1990 [JP] Japan .................................. 2-61878

[51] Int. Cl.[5] ............................................ B60K 37/00
[52] U.S. Cl. .................................... 180/90; 280/779; 296/70; 296/192
[58] Field of Search ............... 180/90, 89.1; 280/779; 296/192, 70, 72, 196, 197

[56] References Cited

U.S. PATENT DOCUMENTS

| | | | |
|---|---|---|---|
| 3,788,681 | 1/1974 | Barenyi et al. | 296/192 |
| 4,350,383 | 9/1982 | Kikuta | 180/90 |
| 4,372,410 | 2/1983 | Loken et al. | 180/90 |
| 4,582,156 | 4/1986 | Kochy et al. | 180/90 |
| 4,699,419 | 10/1987 | Kawase et al. | 296/192 |
| 4,733,739 | 3/1988 | Lorenz et al. | 180/90 |
| 4,826,234 | 5/1989 | Komatsu | 296/70 |
| 5,005,898 | 4/1991 | Benedetto et al. | 296/197 |

FOREIGN PATENT DOCUMENTS

| | | | |
|---|---|---|---|
| 0081656 | 6/1983 | European Pat. Off. | 180/90 |
| 0141959 | 5/1985 | European Pat. Off. | 296/70 |
| 2635069 | 2/1990 | France | 180/90 |

Primary Examiner—Kenneth R. Rice
Attorney, Agent, or Firm—Thompson, Hine and Flory

[57] ABSTRACT

A vehicle body side member of a closed sectional construction extending in the widthwise direction of a vehicle body is provided between right and left roof pillars of a vehicle body and a first unit which comprises at least a cowl member and a windshield wiper system provided in the cowl member and a second unit which comprises at least an instrument panel and a steering system are mounted in the front of the vehicle body side member and in the rear of the vehicle body side member respectively. By this arrangement, the assembling operation of members and systems attached around a dash panel can be easier and accordingly, the simpler and faster operation can be planned. Also, the endurance efficiency for collision shock can be improved by restricting both units moving to the rear on a head-on collision by the above vehicle body side member.

28 Claims, 14 Drawing Sheets

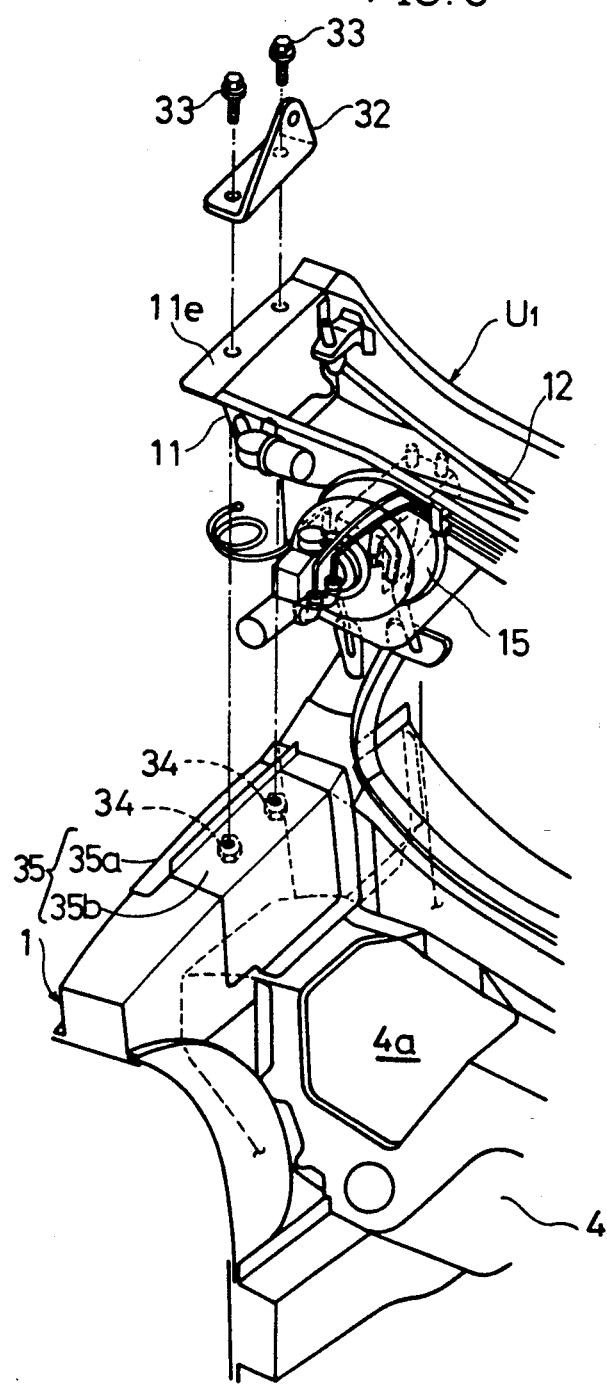
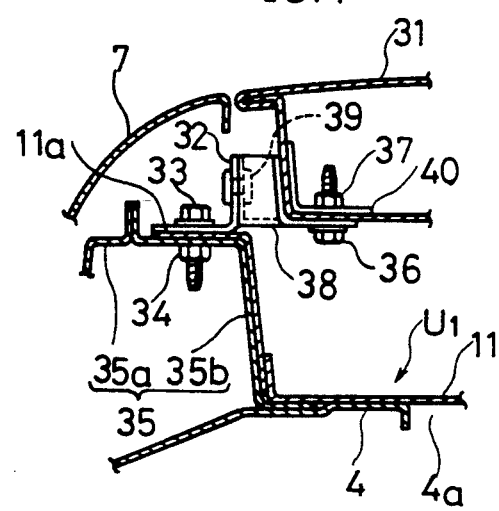

FIG. 15

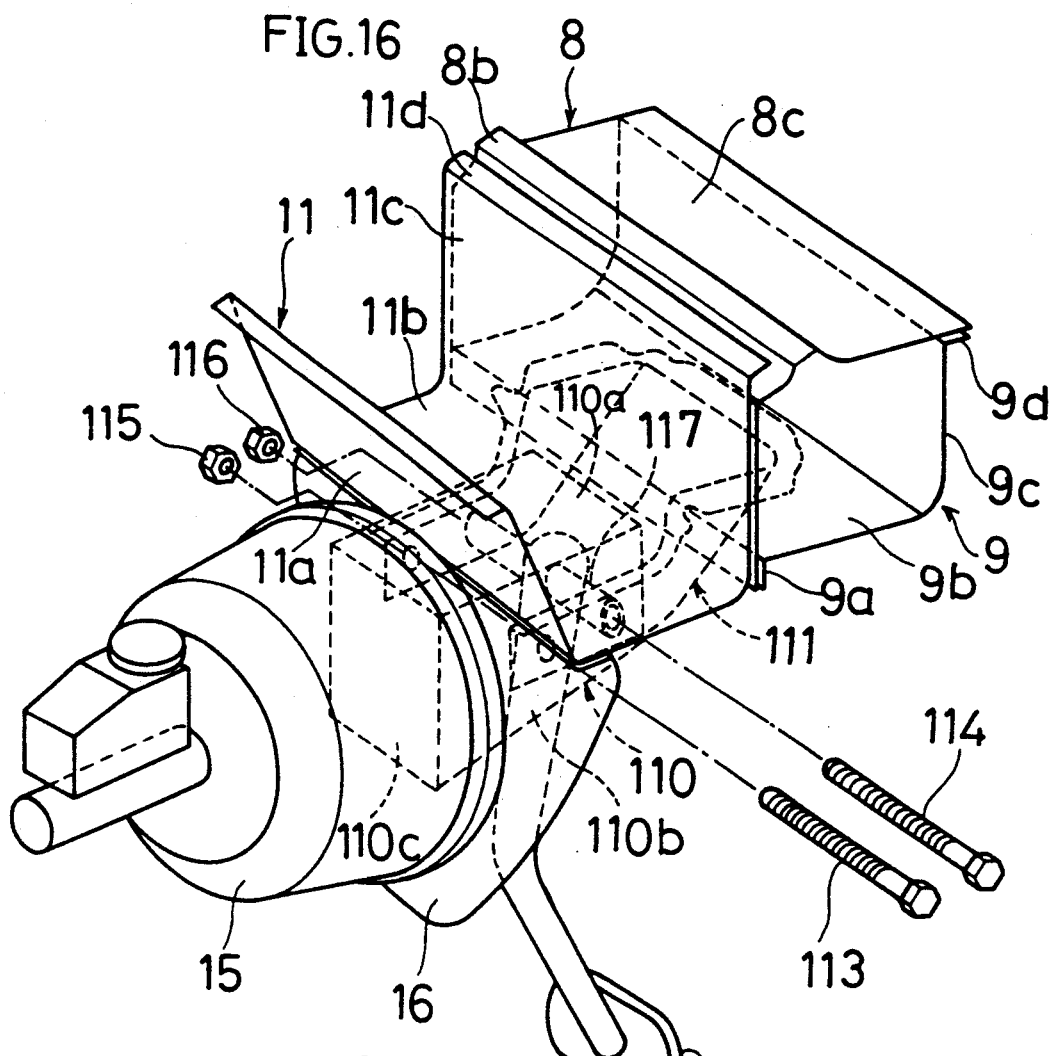

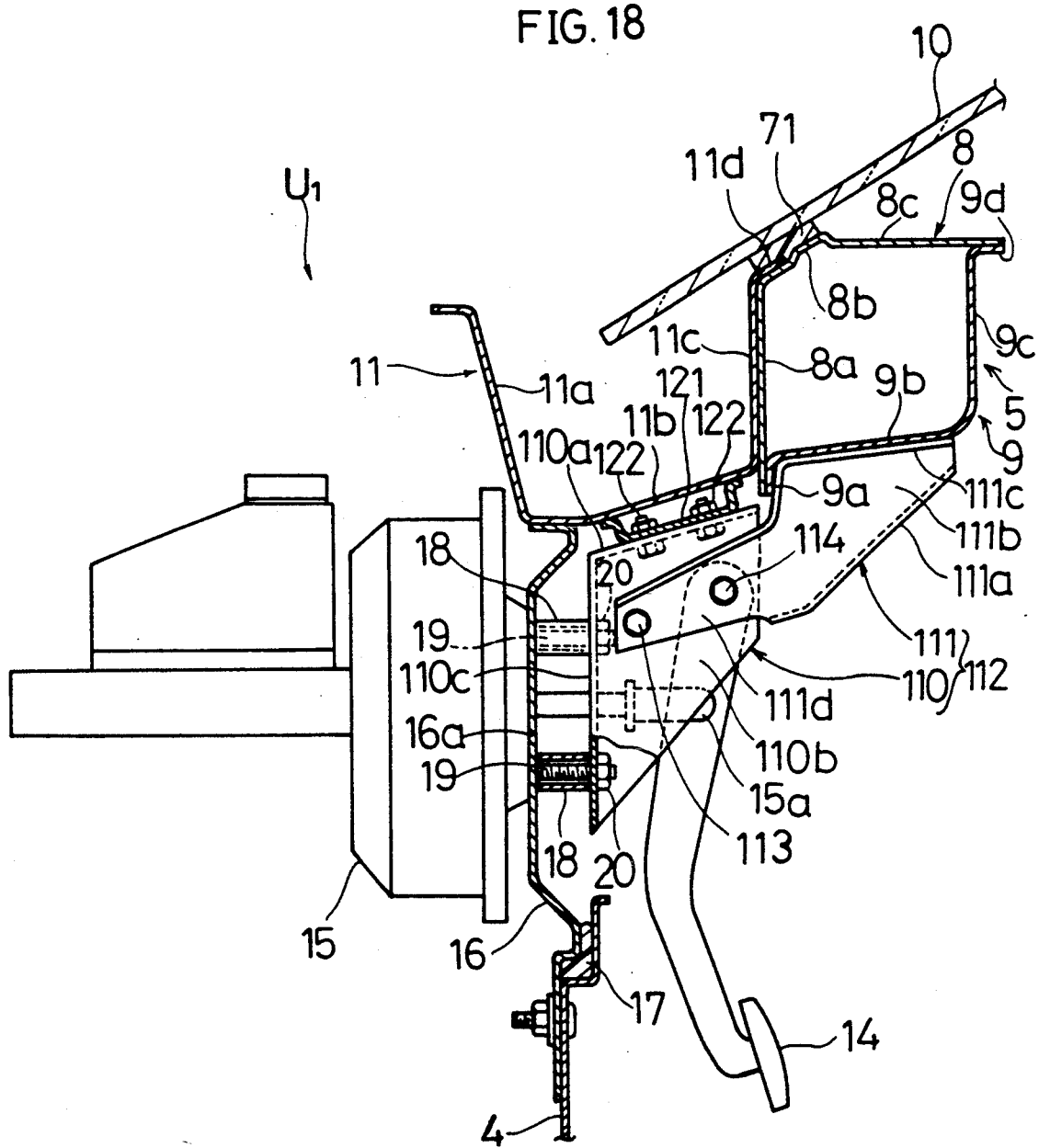

STRUCTURE OF A FRONT BODY OF A MOTOR VEHICLE AND A METHOD OF ASSEMBLING A VEHICLE BODY

BACKGROUND OF THE INVENTION

The present invention relates to a front body of a motor vehicle wherein two units are provided around a dash panel, which partitions a engine compartment from a passenger compartment, and a method of assembling a vehicle body.

Recently combining motor vehicle components into a unit has been trying in order to simplify the assembling operation and to decrease the number of working stations in an assembly line in manufacturing motor vehicles.

As disclosed in the Europe Patent Application Laying Open Gazette No. 81656, inserting a unit, which incorporates an instrument panel, an air conditioning system, a steering system, a part of a dash panel, a brake pedal, and a brake mutiplier system, etc., to inside the vehicle body through an opening of the side door of a vehicle body, and mounting the unit in a dash panel from the inside of the vehicle body was proposed.

The Japanese Patent Application Laying Open Gazette No. 59-206267 proposed another incorporated unit including a cowl panel and a dash panel mounted in the vehicle body from the upper side through an opening of a front windshield.

In the former example (Europe Patent Application Laying Open Gazette No. 81656), since a cowl panel is left in the vehicle body side, a windshield wiper system which is to be installed in the cowl panel cannot be incorporated in the unit and the operational efficiency of installation is not fully improved. Although a steering shaft of a steering system and a brake mutiplier system are located in the engine compartment side through the opening of a dash panel, the location of the brake multiplier system in the upper side of the steering shaft is inevitably determined so that the brake multipiler system does not interrupt the steering shaft since the steering shaft of the steering system is primarily placed.

In case that thus determined location of the brake multiplier system overlaps with the cowl panel in the vertical direction of the vehicle body, when the brake multiplier system and the cowl panel are inserted through an opening of the dash panel, the installation may be complicated since vertical movement of the unit is needed to prevent the brake multiplier system from interrupting the cowl panel. To avoid this, the locational relationship between the cowl panel and the brake multiplier system is restricted when designing the vehicle body.

On the other hand, in the latter example (Japanese Patent Application Laying Open Gazette No. 59-206267), since the unit is inserted from the upper side of the vehicle body through an opening of a front windshield, the side of an instrument panel is restricted by front pillars which constitute right and left side ends of an opening of the front windshield and accordingly, the side part of the instrument panel is cut compared with the usual case. Consequently, the structure of the connecting part between the side part and the vehicle body may be complicated. Moreover, even a cowl member to secure rigidity in the horizontal direction is included in the above unit side and the unit is mounted in the vehicle body, the cowl member is not welded to the vehicle body like a conventional embodiment. Therefore the supporting force for the shock load on a head-on collision is less than the conventional construction which does not combine vehicle components into a unit. Thus, the whole unit may move to the rear of the vehicle body.

SUMMARY OF THE INVENTION

The object of the present invention is to provide a structure of a front body of a motor vehicle and a method of assembling a vehicle body to improve the operational efficiency of assembling a motor vehicle without damaging the configuration of side part of the instrument panel and endurance efficiency for a head-on collision.

The present invention comprises such a structure for front body of motor vehicle to achieve the above object as described below.

A vehicle body side member of a closed sectional construction extending in the widthwise direction of a vehicle body between right and left front pillars of the vehicle body is provided. Also, a first unit having at least a cowl member and a windshield wiper system installed on the cowl member is fitted in the front of the vehicle body side member and a second unit having at least an instrument panel and a steering system is fitted in the rear of the vehicle body side member. Each end of both units is fixed to the vehicle body by tightening bolts.

A method of assembling a motor vehicle body comprises steps as fellows: inserting the first unit from the upper side and both ends of the unit is fixed to the vehicle body by tightening bolts, which first unit comprises at least a cowl member and a windshield wiper system installed on the cowl member in the front of the vehicle body side member of a closed sectional construction which connects between front pillars and extends in the widthwise direction of the vehicle body from the upper side and inserting the second unit to a passenger compartment from an opening of the vehicle door to be disposed in the rear of the vehicle body side member of the above closed sectional construction and both ends of the units are fixed to the vehicle body by tightening bolts, which second unit comprises at least an instrument panel and a steering system.

According to the above structure, the first unit can be mounted from the upper side and the second unit can be mounted from the rear separately with high assembling efficiency. Moreover, since the vehicle body side member of the closed sectional construction is provided between right and left front pillars of the body, there is less possibility that units move to the passenger compartment in case of a head-on collision, etc.

The above and other objects, features, and advantages of the present invention will become more apparent with the description of the preferred embodiment in reference to the accompanying drawings.

BRIEF DESCRIPTION OF THE DRAWINGS

The accompanying drawings show the preferred embodiment. FIGS. 1-7 show the first embodiment of the present invention: in which FIG. 1 is an exploded perspective diagram showing the relationship of location of installation between the cowl unit and the instrument panel unit to the vehicle body;

FIG. 2 is a sectional view wherein the cowl unit is mounted to the vehicle body;

FIG. 3 is a exploded perspective diagram of a connecting part between the cowl unit and the vehicle body;

FIG. 4 is a sectional view of the side connecting part of the cowl unit in the vehicle body;

FIG. 5 is a perspective view showing the structure of installation of a instrument panel unit in the vehicle body;

FIG. 6 is a sectional view taken along the line A—A' of FIG. 5; and

FIG. 7 is an elevational view as viewed from the engine compartment wherein cowl unit is mounted to the vehicle body.

FIGS. 9-14 show the second embodiment: in which

FIG. 9 is a perspective view showing around the cowl side part of the vehicle body;

FIG. 10 is an exploded perspective diagram of FIG. 9;

FIGS. 11, 12, and 13 show sectional views taken along lines B—B, C—C, and D—D respectively of FIG. 9; and FIG. 14 is a perspective view of the side part of the cowl member in the unit side.

FIGS. 15-17 show the third embodiment: in which

FIG. 15 corresponds to FIG. 2;

FIG. 16 is a perspective view showing mounting the cowl unit to the vehicle body; and FIG. 17 is a perspective view showing the installation of the second bracket.

FIG. 18 shows the forth embodiment and corresponds to FIG. 2.

FIGS. 19 and 20 show the fifth embodiment: in which

FIG. 19 corresponds to FIG. 2; and

FIG. 20 is a sectional view taken along the line E—E of FIG. 19.

DESCRIPTION OF THE PREFERRED EMBODIMENTS

Preferred embodiments of the present invention is now described with reference to the accompaning drawings.

Figure 1:
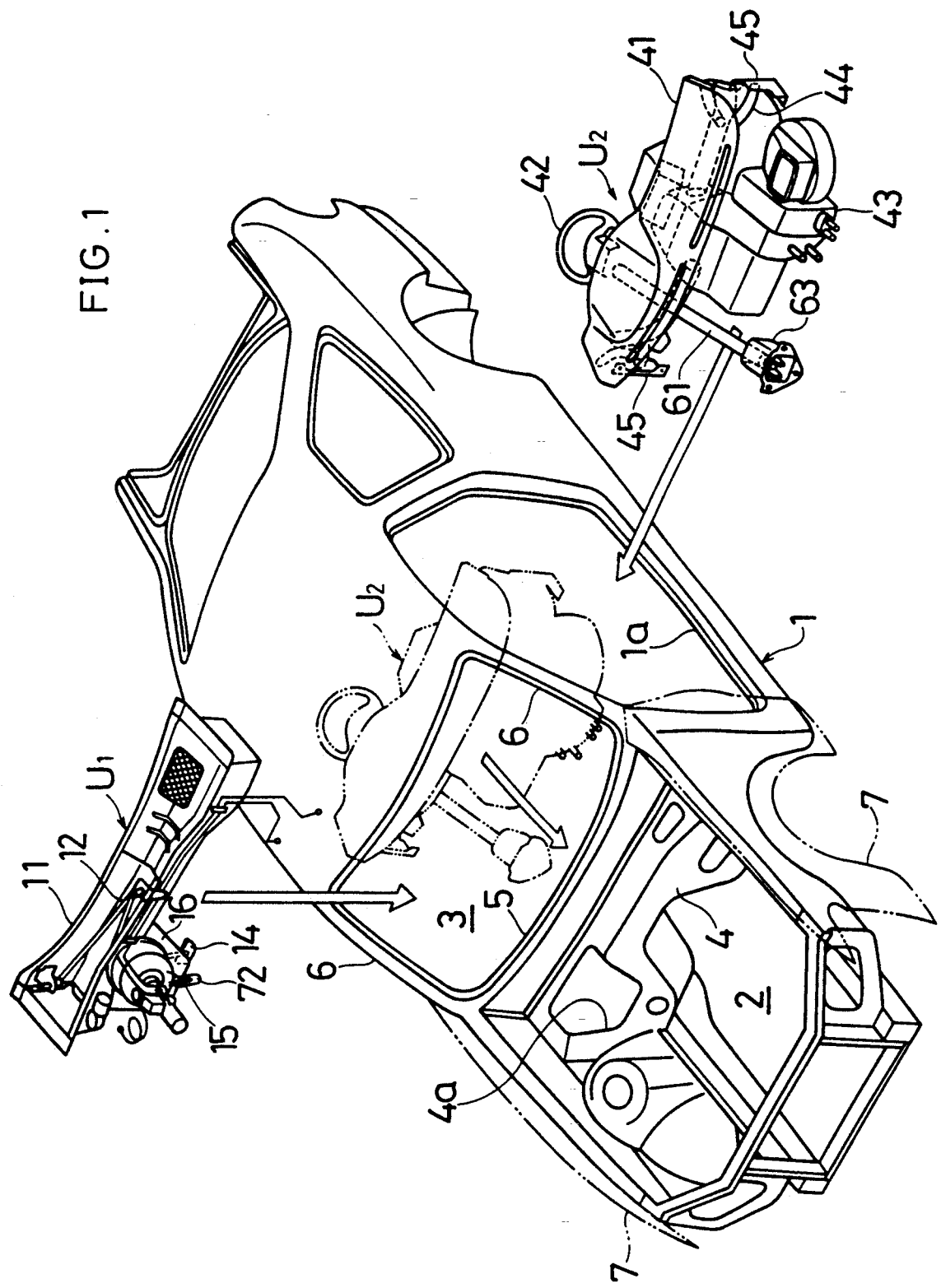

FIGS. 1-7 show a structure of a front vehicle body of the preferred embodiment. In FIG. 1 reference numeral 1 designates a vehicle body wherein a vehicle body side cowl member 5 extending in the widthwise direction of the vehicle body is provided on a dash panel 4 which partitions a engine compartment 2 from a passenger compartment 3. Both ends of the vehicle body side cowl member 5 are attached fixedly to right and left front pillars 6 of the vehicle body 1. A part of the dash panel 4 is cut and forms an opening 4a. The reference numeral 7 designates right and left front fenders.

In the front of the above vehicle body side cowl member 5 the first unit, cowl unit $U_1$, is inserted from the upper side and in the rear of the cowl member 5 the second unit, instrument panel unit $U_2$, is inserted into a passenger compartment 3 from an opening of door 1a of the vehicle body 1. Both ends of units $U_1$ and $U_2$ are fixed to the vehicle body 1 by tightening bolts.

Figure 2:
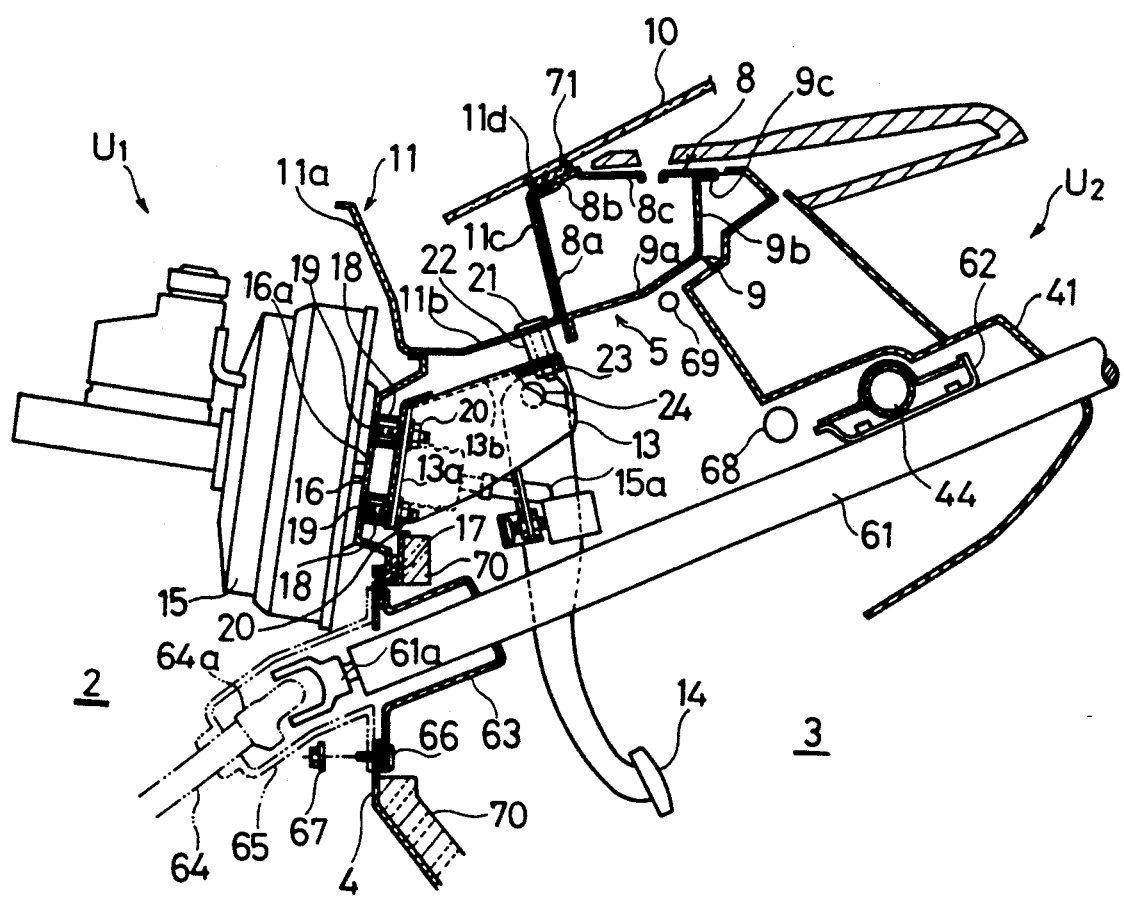

The above vehicle body side cowl member 5 has a closed sectional construction wherein an upper panel 8 and a lower panel 9 are attached as shown in FIG. 2. The above upper panel 8 is composed of a vertical wall part 8a extending in about the vertical direction, a supporting part 8b extending upwardly and obliquely to the rear from the upper edge of a vertical wall part 8a in order to support around the lower end of the wind shield 10, and an upper wall part 8c extending rearward from the rear end of a supporting part 8b. On the other hand, the above lower panel 9 is composed of a bottom wall part 9a extending in the longitudinal direction and attached to the lowermost end of the upper wall part 8a of the above upper panel 8, a vertical wall member 9b standing up from the rear end of the bottom wall part 9a and extending upwardly, and a flange part 9c extending rearwardly from the uppermost end of the vertical wall part 9b and attached to the upper wall part 8c of the upper panel 8. The lower panel 9 can be formed either with the dash panel 4 as a whole or separately from the dash panel 4 wherein the lower panel 9 is connected to the upper end of the dash panel 4 through the front end of the bottom wall part 9a.

The above cowl unit $U_1$ comprises a unit side cowl member 11 extending in the widthwise direction of the vehicle body and opens upward, a windshield wiper system provided in the right side of the cowl member 11 on a vehicle body, a brake pedal 14, brake pedal bracket 13, and a dash member 16 equipped with a brake multiplier system 15.

As shown in FIG. 2, the above cowl member 11 comprises a front wall part 11a extending in the vertical direction on about the same position as the dash panel 4, a bottom wall part 11b extending rearwardly from the lower end of the front wall part 11a, a rear wall part 11c which extends upwardly from the rear end of the bottom wall part 11b and contacts with the front part of the vertical wall part 8a of an upper panel, and an extending part 11d which extends rearwardly from the upper end of the back wall part 11c and contacts with the top of the upper wall part 8c of the upper panel 8. Thus, the unit side cowl member 11 contacts with the front of the vehicle body side cowl member 5 and the conventional structured cowl box is composed of the both cowl members 11, 5.

The above dash member 16 is fixed to the underside of the bottom wall part 11b of the above unit side cowl member 11 and corresponds to the opening 4a of the dash panel 4. Under that the cowl unit $U_1$ is mounted to the vehicle body 1, an opening 4a of the dash panel 4 is closed to form a part of the dash panel 4 and the periphery of the opening 4a is attached by the urethane bonding material 71.

The dash member 16 comprises a projecting part 16a which projects to the front, in which the projecting part 16a the brake multiplier system 15 is fitted to the engine compartment 2, and a brake pedal 14 is supported through the brake pedal bracket 13 in the passenger compartment 3 side. A front wall part 13a of the brake pedal bracket 13 is facing to the projecting part 16a of the dash member 16 with a specified distance by a spacer member 18 which is composed of a cylinder. A front wall part 13b of the brake pedal bracket 13 is also fixed by screwing a studbolt 19 into the nut 20, which the studbolt 19 sticks out in the passenger compartment piercing through the above spacer member 18 from the brake multiplier system. The upper wall part 13b of the brake pedal bracket is fixed by screwing a bolt member 21 into a nut 23, which the bolt member 21 extends downwardly from the bottom wall part 11b of the cowl member 11 through a spacer member 22. Thus, supporting rigidity of the brake pedal 14 is secured. On the brake pedal bracket 13, upper end of the brake pedal 14 is revolvably supported through the axis 24 and the brake pedal 14 is connected with the operational rod 15a of the brake multiplier system 15. Thus, the brake multiplier system is operated by the pedaling operation (rotation) of the brake pedal 14.

Both ends 11e of the cowl member 11, both ends of the above cowl unit $U_1$, are connected by tightening a bolt 33 to the vehicle body with a bonnet hinge 32 which supports a bonnet 31 operably and closably as shown in FIGS. 3 and 4. A side wall part 35 of the vehicle body 1 wherein the end parts 11e of the cowl member 11 are attached is constituted by contacting an outer panel 35a and an inner panel 35b, and on the top side of the side wall part 35 (inner panel 35b) nuts 34 meshed with the above bolts 33 are welded.

On the above bonnet hinge 32 a hinge bracket 38, which is fixed on the bonnet 31 by tightening a bolt 36 into a nut 37, is revolvably fixed through an axis member 39 and a reinforcement 40 is positioned where the hinge bracket 38 of the engine hood 31 is fixed.

Figure 5:
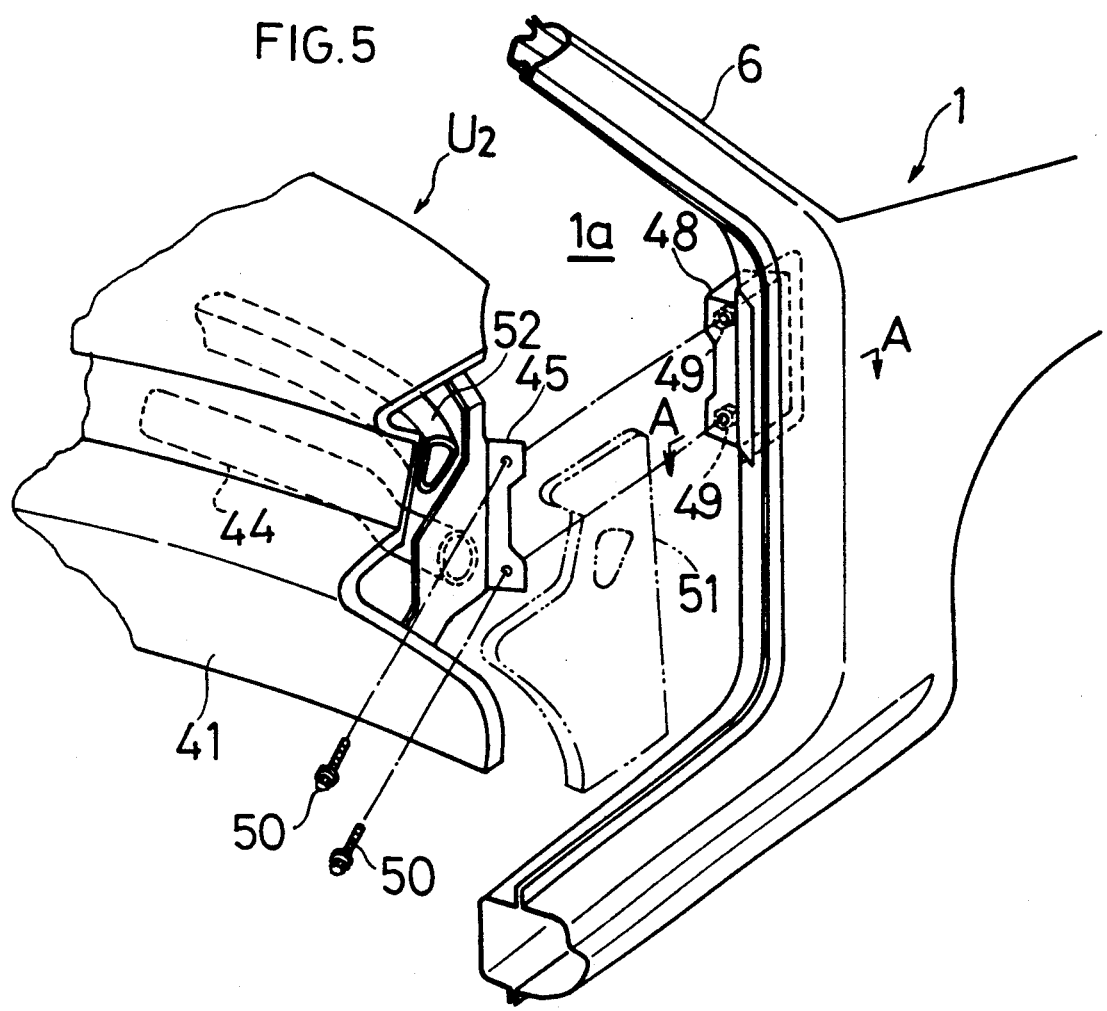
Figure 6:
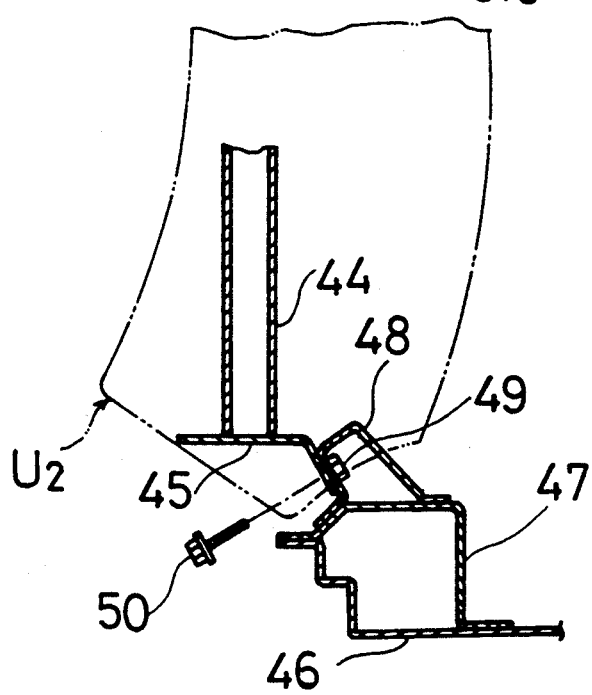

An instrument panel unit $U_2$ comprises a instrument panel 41, a steering system 42, and an air conditioning unit 43 (refer to FIG. 1). An instrument panel member 44 composed by a tube which extends in the widthwise direction of a vehicle body is provided in the front of the above instrument panel 41. As shown in FIGS. 5 and 6, an attaching bracket 45 is fixed to the both ends of the instrument panel member 44. On the door opening 1a in the vehicle body 1 side, a closed sectional construction extending in the vertical direction of the vehicle body by the connection of a side flame outer 46 and a hinge pillar inner 47 under the front pillar 6 is composed, in which hinge pillar inner 47 an instrument panel bracket 48 which is hollow and sticks out to the passenger compartment is provided. A nut 49 is fitted inside the instrument panel bracket 48 and the attaching bracket 45 of the instrument panel member 44 is fixed by tightening a bolt 50 into the nut 49 in the instrument panel bracket 48. In the FIG. 5 the reference numeral 51 designates a instrument panel side which is fitted in the side of the instrument panel unit $U_2$ after instrument panel unit $U_2$ is mounted to the vehicle body 1 and the reference numeral 52 designates a side demister.

An upper shaft 61 (steering shaft) of the above steering system 42 is attached to the instrument panel member 44 through a supporting member 62 and is supported as shown in FIG. 2. A hollow attaching bracket 63 is fixed to the lower end of the upper shaft 61. A hollow attaching bracket 65 is also fixed to the upper end of the lower shaft 64 (steering shaft) connected with a front wheel steering system (not shown in the drawing) in engine compartment side. Thus, the attaching bracket 65 with the attaching bracket 63 is placed fixedly by a bolt 66 and a nut 67 on the dash panel 4. In this way, the supporting rigidity of the steering shaft (upper shaft 61 and lower shaft 64) is secured. Inside the above both attaching bracket 63, 65, a connecting part 61a of the upper shaft 61 is connected with a connecting part 64a of a lower shaft 64.

In FIG. 2 reference numerals 68, 69 designate harness and things similar to harness and reference numeral 70 designates insulators provided in the passenger compartment side of the dash panel 4. A front windshield glass 10 is fitted to the window opening part 1a of the vehicle body 1 by using a urethane bonding material 71 after the cowl unit $U_1$ is mounted to the vehicle body 1. The above urethane bonding material 71 is applied in at least the supporting portion 8b of the upper member 8 of the vehicle body side cowl member 5 and extending part 11d of the unit side cowl member 11 in order to seal the connecting part between the cowl member 11 and the vehicle body 1.

Figure 7:
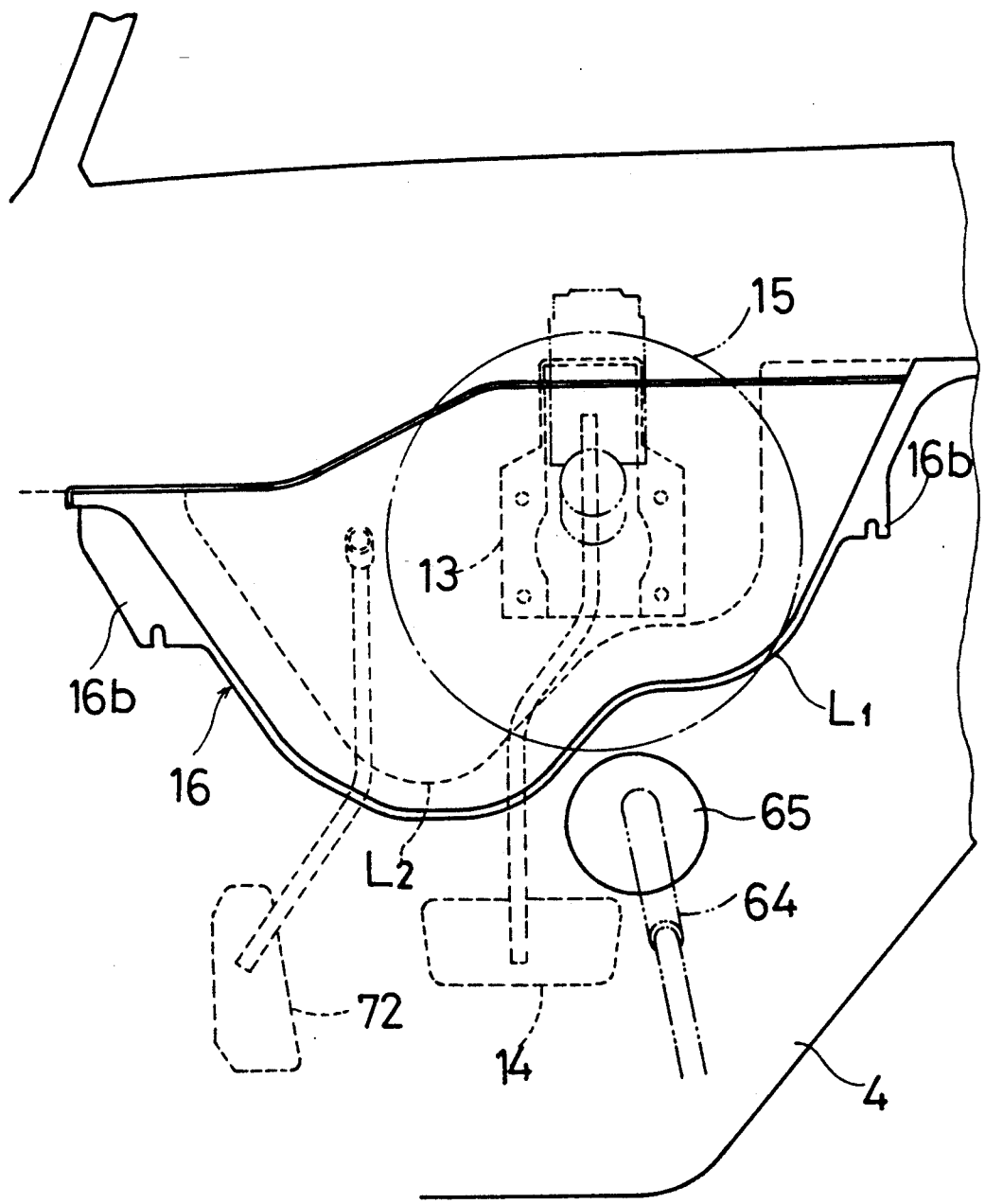

As shown in FIG. 7, around the both ends of the dash member 16, a contacting part 16b which contacts to the vehicle body (dash panel 4) are formed. The reference numeral 72 designates an acceleration pedal adjacent to the brake pedal 14. $L_1$ and $L_2$ designate a unit $U_1$ side trimline and a vehicle body side trimline respectively.

A method of assembling a vehicle body, more particularly of mounting the above cowl unit $U_1$ and instrument panel unit $U_2$ to the vehicle body 1 is described below.

Prepare units $U_1$, $U_2$ which are to be mounted. A cowl unit $U_1$ is provided with a windshield wiper system 12 to the cowl member 11 and also the brake pedal bracket 13, the brake pedal 14, and the brake multiplier system through a dash member 16. And the instrument panel unit $U_2$ is provided with an instrument panel member 28 at its center, the instrument panel 21, a steering system 22, and the air conditioning unit 23.

First, the above cowl unit $U_1$ is inserted in the front of the cowl member 5 in the vehicle body side by bringing the cowl unit $U_1$ straight down from the top of the vehicle body 1. A rear wall part 11c of the unit side cowl member 11, the rear flange part 11d of the unit side cowl member 11, and the side flange part 11e of the unit side cowl member 11 are contacted with a vertical wall part 8a of the vehicle body side cowl member 5 (upper member 8), the supporting portion 8b of the vehicle body side cowl member 5, and the top side of the side end portion of the vehicle body 1 respectively. Under this situation, both ends (side end flange portion 11e) of the above unit side cowl member 11 is fixed to the vehicle body 1 by tightening bolts 33. In case that the brake multiplier system 15 is located above the lowermost surface of the cowl member 11, the above operation can be done easily without being restricted in the vertical direction by the cowl member 11.

Next, the instrument panel unit $U_2$ is inserted from the door opening 1a of the vehicle body 1, then moved to the front from that inserted position so as to be disposed to the rear of the vehicle side cowl member 5. The attaching bracket 45 of the instrument panel unit $U_2$ is fixed to the instrument panel bracket 48 of the vehicle body 1 side by tightening bolts 50. The mounting of the both unit $U_1$ and $U_2$ to the vehicle body 1 is finished by the above operation.

As mentioned above, the windshield wiper system and members or systems, etc. provided around the dash panel 4 of the steering system 42, are combined into units, i.e. the cowl unit $U_1$ and the instrument panel unit $U_2$. Simpler and faster attachment can be planned by mounting those units to the vehicle body 1 than attaching each component separately.

Moreover, since the vehicle side cowl member 5 of a closed sectional construction connecting the right and left roof pillars 6 is provided between the above both unit $U_1$ and $U_2$ as a vehicle body strengthening member, there is little posibility of units $U_1$ and $U_2$ moving to a passenger compartment in case of head-on collision and endurance efficiency for collision shock is almost the same as the conventional structure which does not use units for components. Particularly, according to the present embodiment, since the cowl member 5 of a closed sectional construction composing cowl box is provided in the vehicle body side, a part of the cowl box is not left in the vehicle body side and accordingly, the endurance efficiency for a collision shock can be improved without increasing the weight.

Moreover, since the brake multiplier system 15 and the brake pedal bracket 13, etc. are supported in the dash member 16 which is fixed on the underside of the unit side cowl member 11 and composes a part of the dash panel 4, the brake multiplier system and the brake pedal bracket 13 are supported securely so as to maintain high supporting rigidity.

In the above first embodiment, the cowl box, which composes the lower end of the front windshield opening and extends in the widthwise direction of the vehicle body, is composed by the vehicle body side cowl member 5 and the unit side cowl member 11 and the cowl panel is divided into a vehicle body cowl member 5 side and a unit cowl member 11 side. However, the cowl panel may be provided in the cowl unit $U_1$ side by arranging a member of a closed sectional construction in the vehicle body side instead of the vehicle body side cowl member without dividing cowl panel.

Also, in the above first embodiment, although the cowl unit $U_1$ is mounted to the vehicle body 1 before the instrument panel unit $U_2$ is inserted, the instrument panel unit $U_2$ can be mounted to the vehicle body 1 first.

Figure 8:
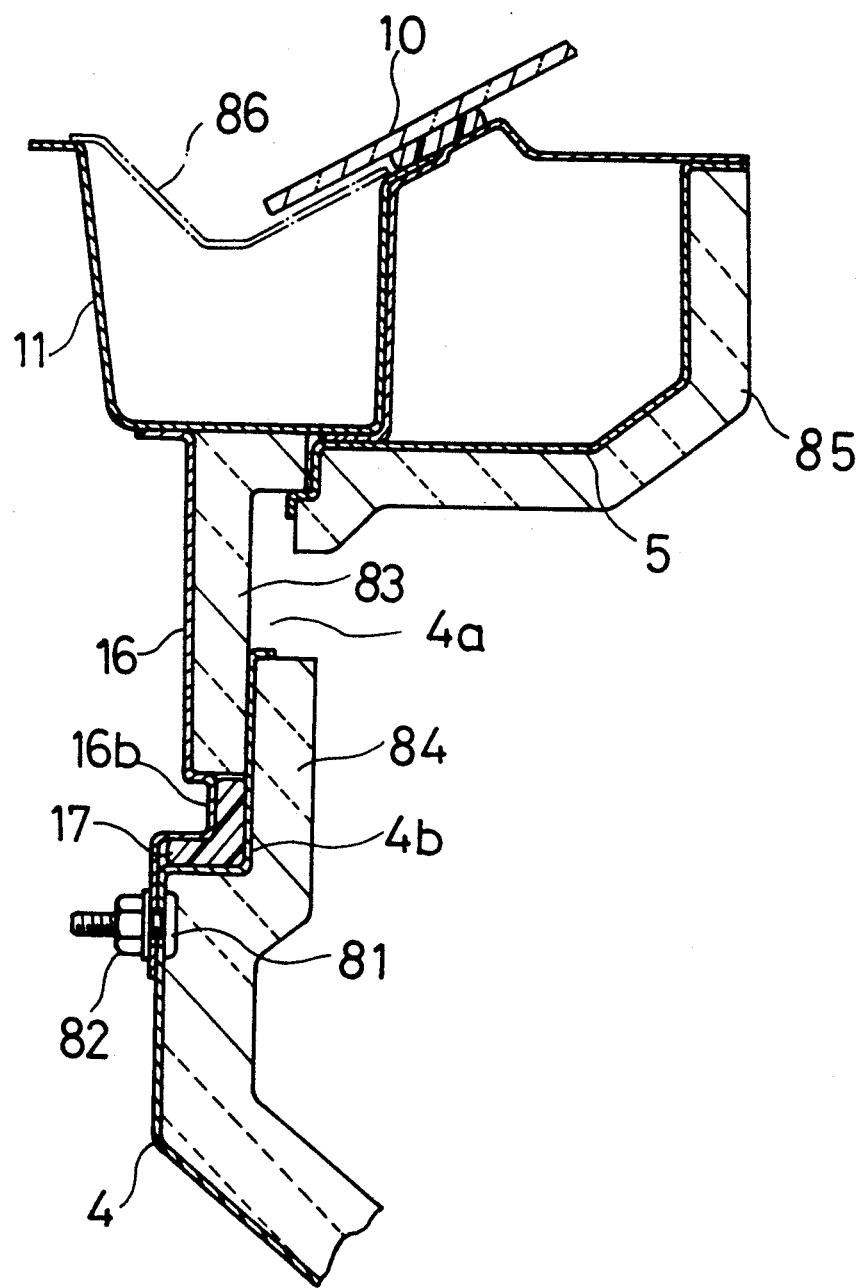
FIG. 8 is a sectional view showing the modification of the mounting structure of the dash member of the cowl unit and a dash panel.
Figure 9:
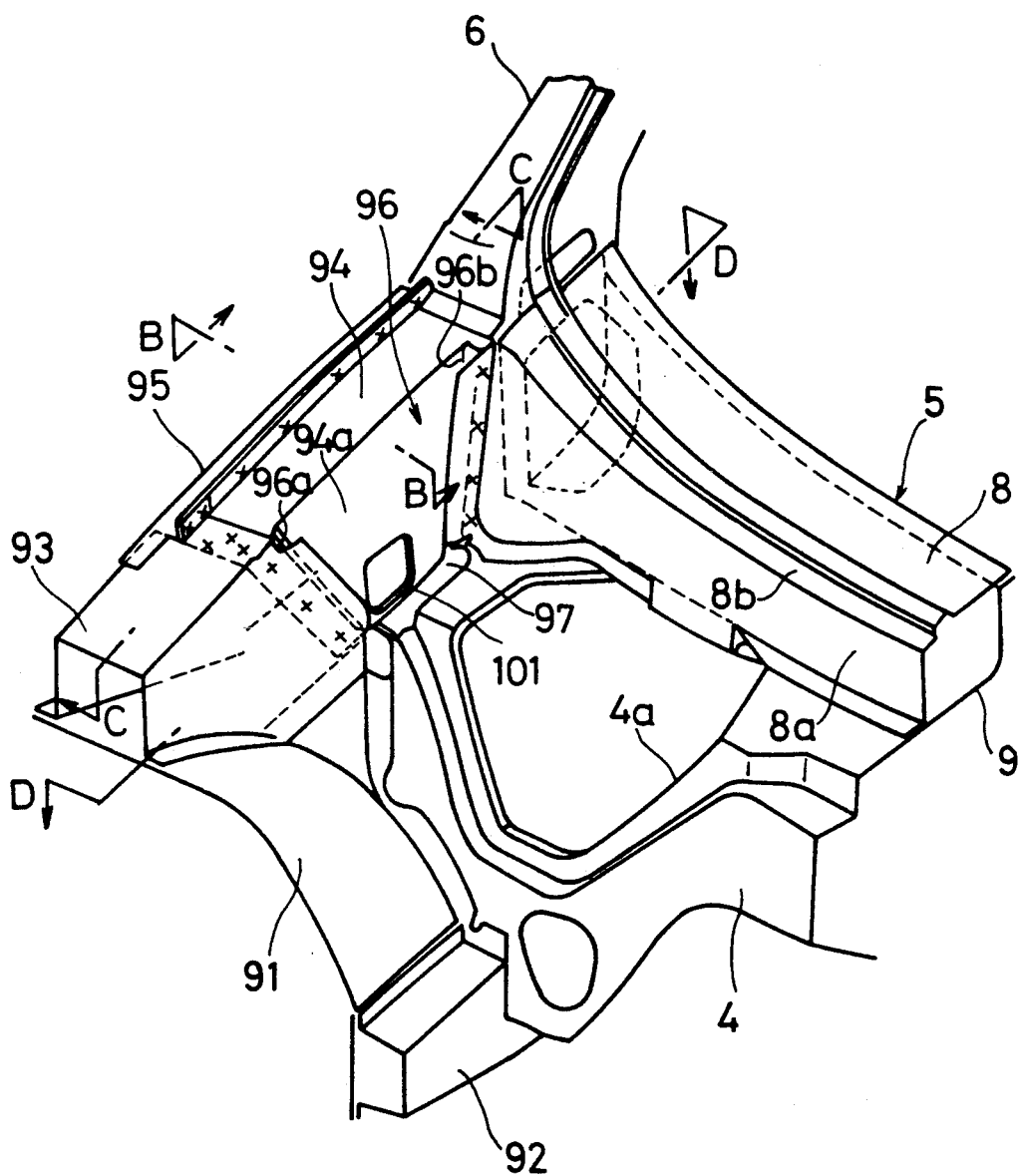
Figure 10:
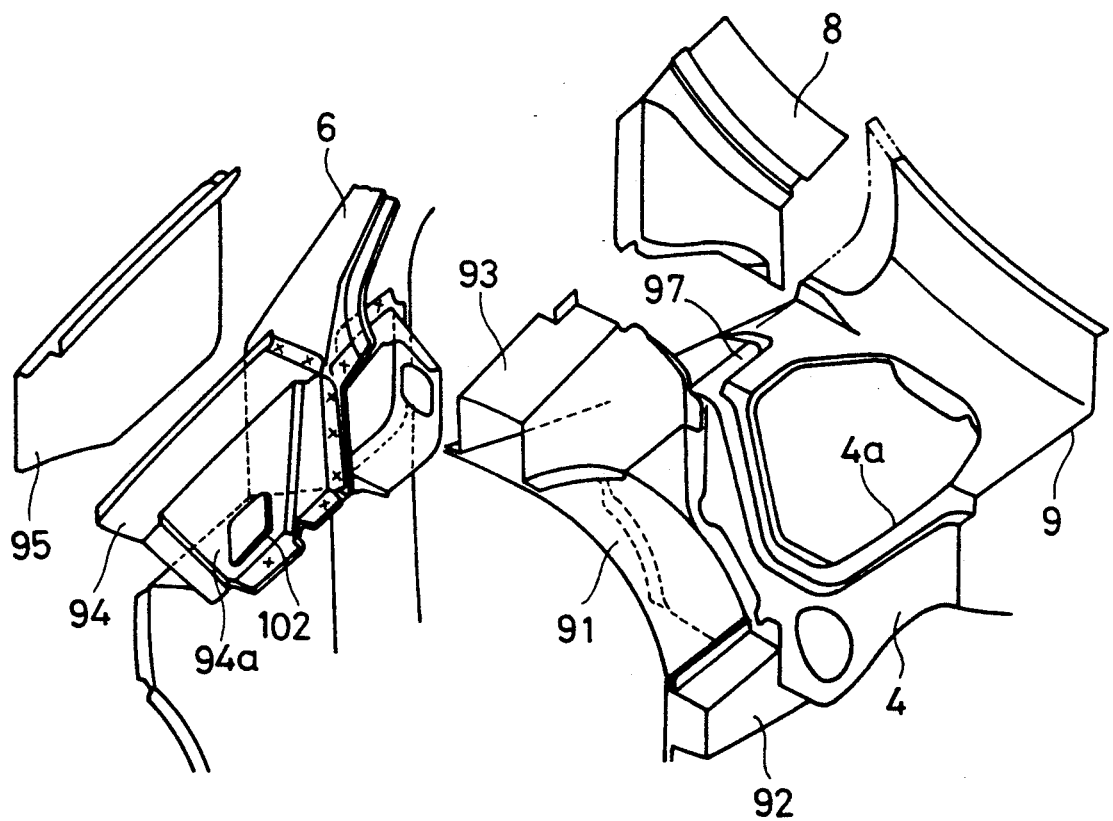

FIG. 8 shows the modified structure of attachment of the dash member and the dash panel of the cowl unit $U_1$. In this modification, the periphery of dash member 16 which is fitted to the unit side cowl member 11 is fixed to the dash panel 4 by tightening bolts 81 into nuts 82 in several places. While a projecting part 16b which projects to the passenger compartment is formed on the periphery of the above dash member 16, a stage part 4b of a closed L-shape is formed on the periphery of the opening 4a in the dash panel 4 corresponding to the projecting part 16b. On the stage part 4b a urethane bonding material 17 is applied between the dash member 16 and dash panel 4. The seals in vertical direction and horizontal direction (in widthwise direction of the vehicle body) is carried out simultaneously. The above urethane bonding material 17 can be applied either on the dash member 16 of the cowl unit $U_1$ side or the dash panel 4 of the vehicle body side.

The dash member 16 and the dash panel 4 are set to overlap each other until to the above of the projecting part 16b of the above dash member 16 and insulators 83, 84 are provided in the passenger compartment side of the dash member 16 and dash panel 4 respectively. By this configuration, efficiency of noise reduction is enhanced. In the FIG. 8 the reference numeral 85 designates an insulator provided in the passenger compartment side of the vehicle body side cowl member 5 and reference numeral 86 designates a grill panel (cowl grill), the rear end of which extends to the lowermost end and backside of the front windshield glass 10.

FIGS. 9-14 show a front vehicle body of the second embodiment, particularly, the structure of the vehicle body side where the side part of the unit side cowl member is connected to. The basic structure of the front vehicle body is the same as the first embodiment and the same reference numbers are used for the same components to avoid repeating description.

In FIGS. 9-13, reference numeral 91 designates a wheel apron which constitutes the side wall of the engine compartment, reference numeral 92 designates a front side frame extending in the longitudinal direction of the vehicle body in the lower part of the wheel apron 91, and reference numeral 93 designates a reinforcement extending in longitudinal direction of the upper part of the wheel apron 91, which the reinforcement 93 cooperates with the wheel apron 91 to form a closed section which is hat shaped.

Reference numeral 94 and 95 designate cowl side inner and cowl side outer respectively provided in order to connect the closed section of the above reinforcement 28 to the front pillar 6. On the side wall part of the cowl side inner 94, a step part 94a concaved to the cowl side outer 95 side is formed in such a way that the step part 94a is a trapezoid having the shorter lower part than the upper part, viewed from the side (engine compartment 2 side). On the other hand, the rear end of the reinforcement 93 which is connected to the front part of the cowl side inner 94 extends to the front end of the above step part 94a so as to form a channel 96a between the step portion 94a. A side end portion of the upper panel 8 which is connected to the rear end of the cowl side inner 94a extends to the rear end of the above step part 94a so as to form a channel 96b between the step part 94a. The above two channels 96a, 96b are open facing each other and extending in the vertical direction with the upper part has the wider space between them. A divergent positioning portion 96 facing upward is formed, which the positioning portion 96 connects with the side part (later described side flange part 11e, 11g) of the unit side cowl member 11 by the both channel 96a, 96b to determine the position in the longitudial direction.

The side end part of the dash panel 4 is connected with lower part of the above cowl side inner 94 of which connecting part is one step lower than the other parts and channel 97, which extends in the longitudinal direction between the lower end of the above channel 96a and 96b, is formed by a step part 29a of the side part of the dash panel 4 and the lowermost part of the cowl side inner 94.

Figure 14:
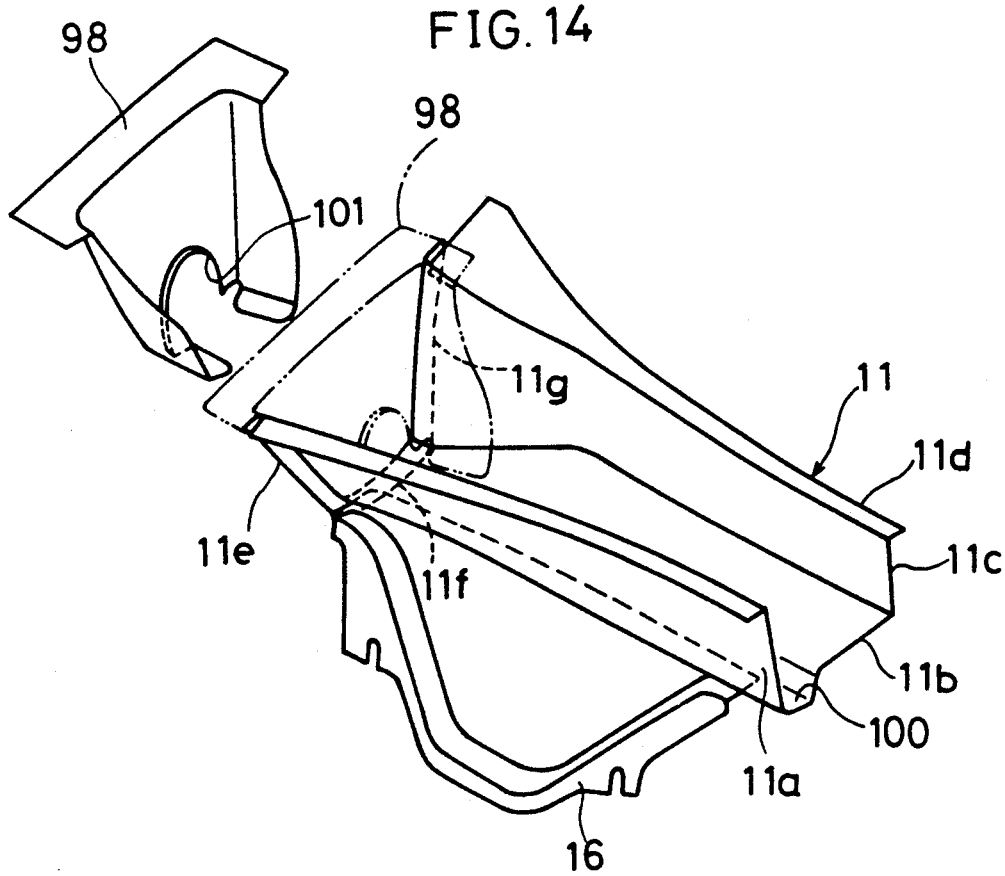

In the side part of the above unit side cowl member 11 the front wall part 11a and the rear wall part 11c open upward corresponding to the configuration of the step part 94a of the above cowl side inner 94 as shown in FIG. 14 and in the side part flange parts 11e, 11f, 11g are formed by holding the front wall part 11a, the bottom wall part 11b and the rear wall part 11c respectively. Also, a cowl unit side 98 is provided in the side of the cowl member 11 for reinforcement by closing the side edge opening.

Figure 11:
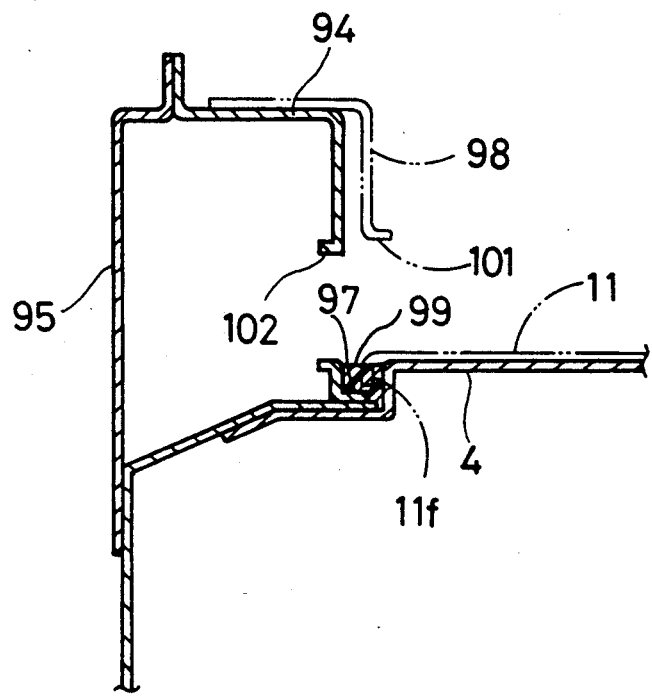
Figure 12:
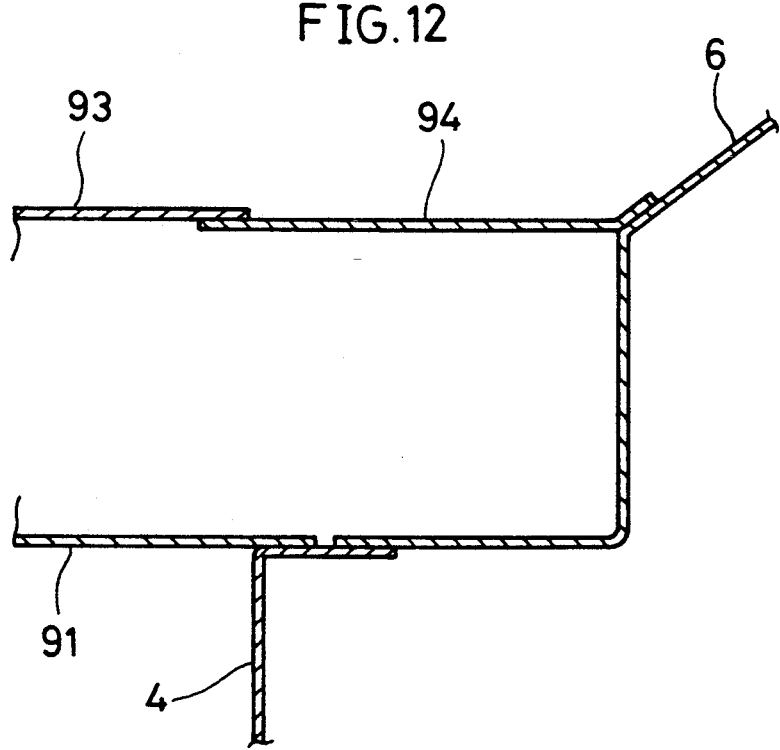
Figure 13:
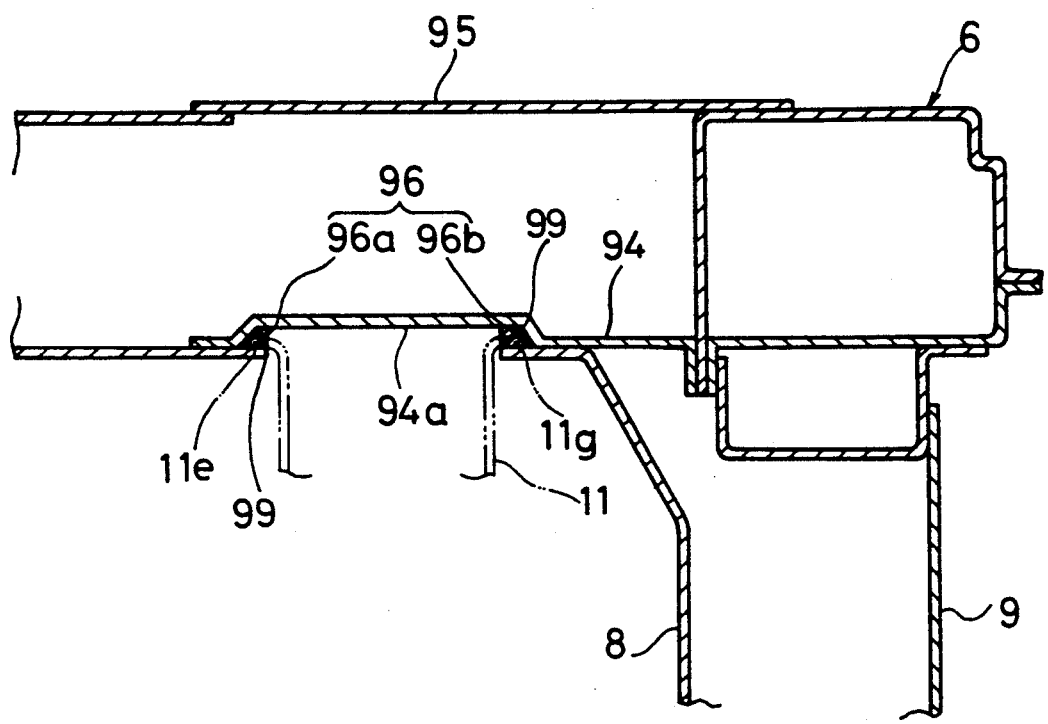

As shown in FIGS. 11 and 13 by a dotted line, the above cowl member 11 fixes the side end flange part 11e, 11g and side flange part 11f to each channel 96a, 96b of the positioning portion 96 in the vehicle body 1 side and the channel 97 of the vehicle body 1 respectively by the urethane bonding material. A lane rail part 100 extending in the widthwise direction of the vehicle body is formed in the bottom wall part 11b of the cowl member 11. In the cowl unit side 98 and cowl side inner 94, opening 101 and 102 are formed respectively corresponding to the lane rail part 100.

To describe a method of mounting the above unit side cowl member 11 and cowl unit $U_1$ (refer to FIG. 1) to the vehicle body 1, a urethane bonding material 99 is applied inside of the each channel 96a, 96b of the positioning portion 96 provided in the cowl side (side wall part) of the vehicle body 1 and channel 97 before mounting the cowl unit $U_1$ to the vehicle body 1.

The above cowl unit $U_1$ is inserted into the front of the vehicle body side cowl member 5 by bringing it almost straight down from the upper side of the vehicle body 1 and the rear wall part 11c and rear side flange part 11*d* of the cowl member 11 are overlapped with each other and disposed to a vertical wall part 8*a* of a vehicle side cowl member 5 (upper panel 8) and a glass supporting part 8*b* respectively.

The cowl member 11, the main part of the cowl unit $U_1$, is inserted to a position where the side part of the cowl member 11 corresponds to a cowl side of the vehicle body and side end flange parts 11*e*, 11*g* are connected to each channel 96*a*, 96*b* of positioning portion 96 in the cowl side. Thus, the position in the longitudinal direction is determined and consequently, the mounting of the cowl unit $U_1$ can be carried out easily and precisely.

Moreover since the side end flange part 11*e*, 11*g* of the cowl member 11 is positioned by connecting each channel 96*a*, 96*b* of the positioning portion 96 at the point of completing inserting the cowl member 11, which positioning portion 96 is facing upward and divergent, a bonding material 99 applied inside each channel 96*a*, 96*b* is not moved to the down by contacting to the side flange part 11*e*, 11*g* of the cowl member 11 during inserting the cowl member 11. As a result, the side flange part 11*e*, 11*g* of the cowl member 11 is attached by the bonding material 99 which is applied evenly in the longitudinal direction (almost vertical direction) in the positioning portion 96 at the determined position and accordingly, the strength of the connection of the cowl member 11 can be improved.

Figure 15:
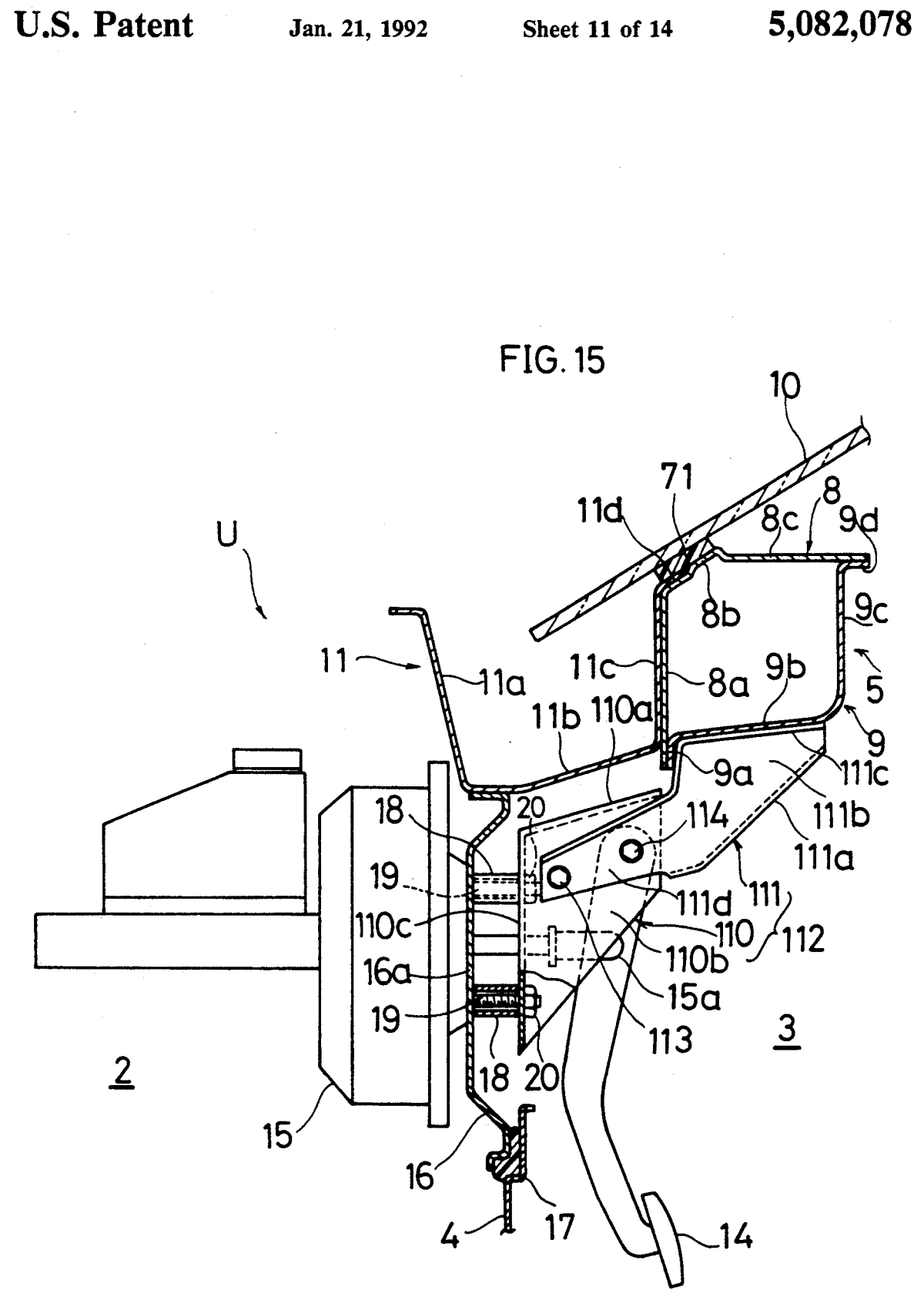

FIG. 15-17 show the front vehicle body of the third embodiment of the present invention. Although this third embodiment is a modified structure of the brake pedal bracket 13 supporting the brake pedal 14, the basic structure of the front vehicle body is almost the same as the first embodiment.

In FIG. 15, the vehicle side cowl member 5 has a closed sectional construction wherein the upper panel 8 and lower lower panel 9 are connected. The above upper panel 8 comprises the vertical wall part 8*a* extending in almost vertical direction, the glass supporting part 8*b* which extends to the rear and upward obliquely from the upper end of the vertical wall part 8*a* and supports around lower end of the front windshield glass 10 by mounting firmly through the bonding material 71, and the upper wall part 8*c* extending rearwardly from the rear end of the supporting portion 8*b*. The lower panel 9 comprises the lower flange part 9*a* connected to the lower end of the vertical wall part 8*a* of the upper panel 8, the bottom wall part 9*b* extending rearward from the upper end of the flange part 9*a*, the vertical wall part 9*c* which stands up from the rear end of the bottom wall part 9*b* and extends upwardly, and an upper flange part 9*d* which extends rearwardly from the vertical wall part 9*c* and connected to the rear end of the upper wall part 8*c* of the upper panel 8.

The cowl unit $U_1$ comprises the unit side cowl member 11 extending in the widthwise direction of the vehicle body, the windshield wiper system provided in the cowl member 11 (not shown in the drawings), and a dash member 16 having a brake pedal 14 and the brake multiplier system 15. The above cowl member 11 comprises the front wall part 11*a* extending in the vertical direction at the almost same position as the dash panel 4, the bottom wall part 11*b* extending rearwardly from the lower end of the front wall part 11*a*, and the rear wall part 11*c* which extends upwardly from the rear end of the bottom wall part 11*b* and contacts with the front of the vertical wall part 8*a* of the upper panel 8, and the flange part 11*d* which extends rearwardly from the upper end of the rear wall part 11*c* and contacts with the upper side of the glass supporting portion 8*b* of the above upper panel 8. Thus, unit side cowl member 11 is positioned in the front of the vehicle body side cowl member 5 and a cowl box of a conventional structure is composed by the both cowl member 11 and 5.

The above dash member 16 is fixed on the underside of the bottom wall part 11*b* of the above unit side cowl member 11 so as to correspond to the opening 4*a* of the dash panel 4 and closes the opening 4*a* of a dash panel 4 to compose a part of the dash panel 4 under such a situation that the cowl unit $U_1$ is attached to the vehicle body 1 and then the dash member 16 is attached to the periphery of the opening 4*a* through the urethane bonding material 71.

The dash member 16 having the projecting part 16*a* which projects to the front, in which 16*a* the brake multiplier system 15 is attached in the engine compartment 2 and the brake pedal 14 is supported by a first bracket 110. The above brake pedal 14 is also supported by the vehicle body side cowl member 5 through a second bracket 111 and a brake pedal 112 which supports the brake pedal 14 is composed by the above first and second bracket 110, 111 respectively.

The above first bracket 110, as shown in FIG. 16, comprises an upper wall part 110*a* facing to the bottom wall part 11*b* of the cowl member 11, a pair of right and left side walls 110*b* etending downwardly from the both right and left side ends of the upper wall part 110*a*, and a front wall part 110*c* which extends downwardly from the front end of the above upper wall portion 110*a* and butt-connected with both sides of the above side wall parts 110*b*. The above front wall portion 110 is fixed in such a way: the above front wall part 110*c* faces to the projecting part 16*a* of the dash member 16 with a specified distance by the spacer members 18 composed by tubes and a nut 20 is meshed with a studbolt 19 which comes out in the passenger compartment though inside of the above spacer member 18 from the brake multiplier system 15.

The above second bracket 111, as shown in FIG. 17, comprises an inclining wall part 111*a* which inclines to the rear and upwardly under the vehicle body side cowl member 5, a pair of right and left side wall parts 111*b* extending upwardly from right and left side ends of the inclining wall part 111*a*, a flange part 111*c* which is formed over the upper end of the above inclining wall part 111*a* and right and left side wall parts 111*b* and is connected to the bottom wall part 9*b* of the lower panel 9 of the vehicle body side cowl member 5, and a stretching out part 111*d* which stretches out below the unit side cowl member 11 from the above both side wall part 111*b*. Right and left side wall parts 110*b* for the first bracket 110 are located between the above right and left stretching out parts 111*d*, and the first bracket 110 and the second bracket 111 are connected together by front and rear bolts 113, 114, which pierce the side wall parts 110*b* and the stretching out parts 111*d* and nuts 115, 116 which mesh with those bolts. A supporting shaft 117 made by a tube is provided as a whole rotational device and pierces in the widthwise direction of the vehicle body on the upper part of the brake pedal 14. The brake pedal 13 is supported revolvably about axis of the supporting shaft 117 (bolt 114) by inserting the above bolt 114 to inside the supporting shaft 117.

Next, a method of assembling a vehicle body, particularly, a method of mounting the above cowl unit $U_1$ to the vehicle body 1 is described below.

While preparing the cowl unit $U_1$ which is to be mounted, the brake pedal bracket 111c of the brake pedal bracket (the second bracket) 111, whose stretching out part 111d stretches out to the front from the lower part of the vehicle body cowl member 5, is attached to the bottom wall part 9b of the lower panel 9 of the vehicle side cowl member 5 in the vehicle body 1.

First, in the vehicle body the cowl unit $U_1$ is inseted to the front of the vehicle body side cowl member 5 from the top and the rear wall part 11c of the unit side cowl member 11 and the flange part 11d of the unit side cowl member 11 are contacted with the vertical wall part 8a of the upper panel 8 of the vehicle body side cowl member 5 and glass supporting portion 8b of the upper panel 8 respectively. In this situation cowl member 11, namely, a cowl unit $U_1$ is mounted to the vehicle body 1 by tightening bolts (not shown in the drawings).

In this case, since the unit side brake pedal bracket 110 is positioned only in the lower part of the cowl member 11, the bracket 110 won't interrupt with the vehicle side cowl member 5. The stretching out parts 111d of the brake pedal bracket 111, which is in the vehicle body 1 (cowl member 5) side, stretches out to the front from the lower part of the cowl member 11. However, in mounting the cowl unit $U_1$, the brake pedal bracket 110 in the above unit side is just inserted between the stretching out parts 111d from the top. Accordingly, cowl unit $U_1$ can be inserted in the front of the vehicle body cowl member 5 easily by bringing it straight down without being restricted from the both brake pedal bracket 110 and 111. Thus, higher mounting efficiency of can be achieved.

Then a contacting part of the above both brake pedal bracket 110 and 111, namely, both side wall parts 110b of the bracket 110 and both stretching out parts 111d of the bracket 111 is connected by tightening bolts 113 and 114 into nuts 115 and 116. At that time, supporting shaft 117 on the upper part of the brake pedal 14 is disposed between both side wall parts 110b of the bracket 110 and the above bolts 114 is inserted into the supporting shaft 117 so as to connect the brake pedal brackets 110, 111.

In this case, the supporting rigidity of the brake pedal 14 can be improved since the above brake pedal 14 is not only supported by the unit side cowl member 11 through bracket 110 and dash member 16, but also supported by vehicle body side cowl member 5 of a closed sectional construction through two brackets 110 and 111.

FIG. 18 shows the forth embodiment. In this embodiment, not only the first bracket 110 of the two brake pedal brackets is fixed to the dash member 16 by the front wall part 110c, but also its upper wall part 110a is fixed to the attaching plate 121 which is fitted on the underside of the bottom wall part 11b of the unit side cowl member 11 by tightening bolts into nuts 122. Thus, endurance for attachment of the bracket 110 to the unit side cowl member 11 and the supporting rigidity of the brake pedal 14 can be improved. The other structure in the front vehicle body is the same as the third embodiment, therefore the same reference numbers are used for the same components to avoid repeating the description. Also as a method of fixing the upper wall part 110a of the bracket 110 to an attaching plate 121, it may be welded instead of tightening bolts into nuts 122.

Figure 19:
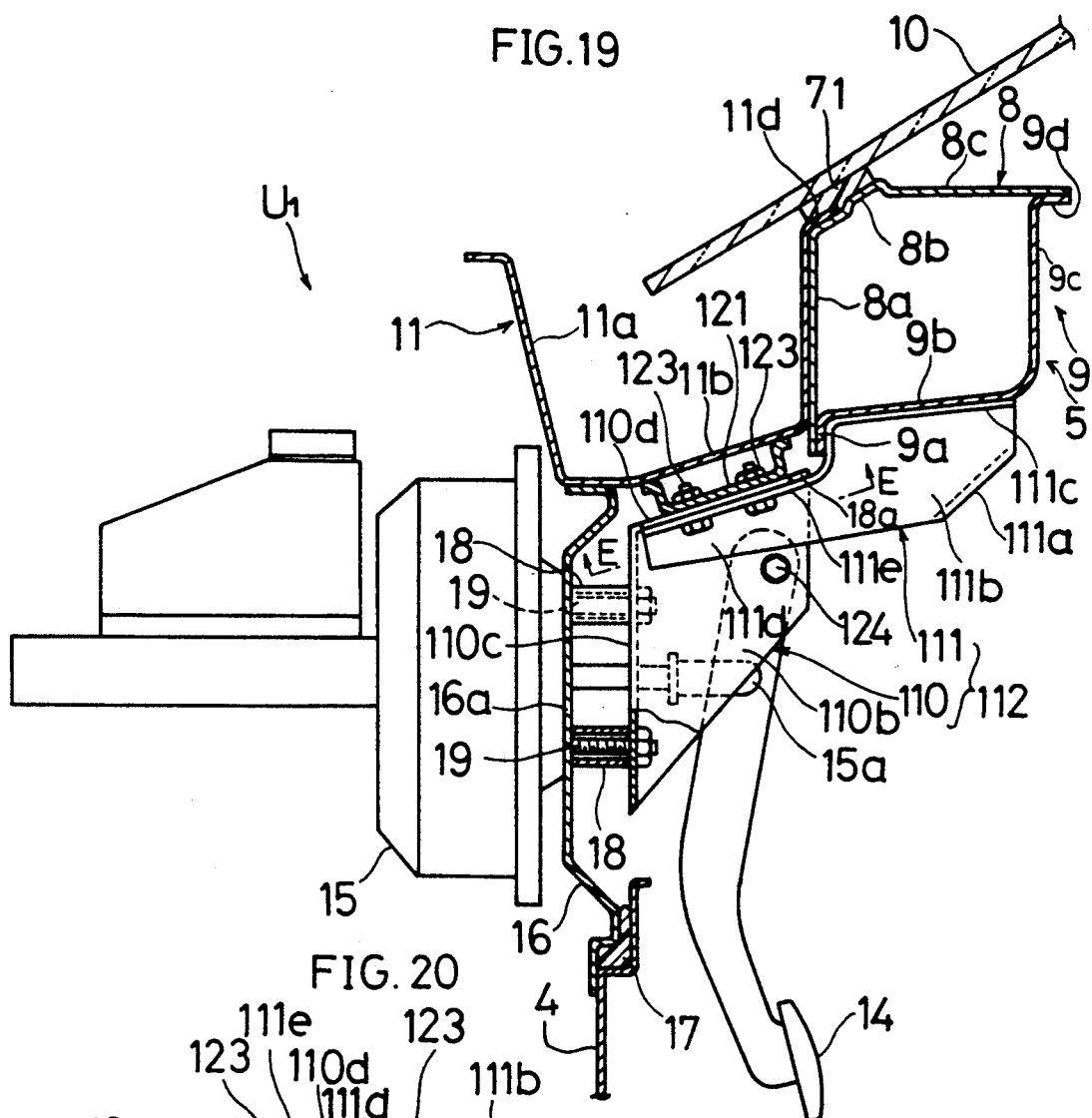
Figure 20:
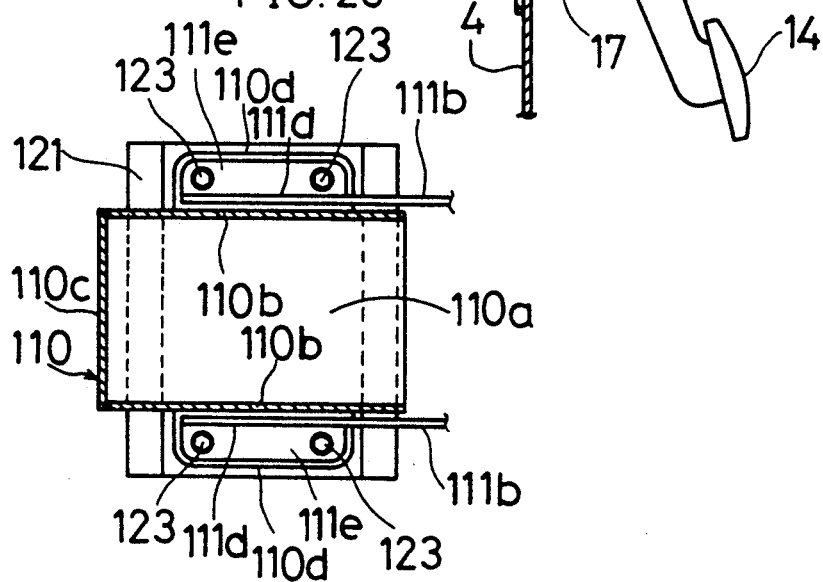

FIG. 19 and 20 show the fifth embodiment, where two brackets 110, 111 of the brake pedal bracket 112 are connected to the attaching plate 121 which adheres on the underside of the bottom wall part 11b of the unit side cowl member 11 by tightening the bolts into nuts 123 and at another place where the bolts and nuts are tightened the brake pedal 14 is supported revolvably by the first bracket through the supporting shaft 124. On the position of the bolts and nuts are tightened, a projecting part 110d which projects to the side from the side wall part 110b and the flange part 111e extending horizontally to the outside in the widthwise direction of the vehicle body are formed in the side end of the upper wall part 110a of the first bracket 110 and the upper end of the stretching out part 111d of the second bracket 111 respectively. Also, both 110d and 111d are overlapped each other to connect the attaching plate 121 and these three are fixed by tightening the bolts into nuts 123. The structure of front vehicle body and other components are the same as the third embodiment and the same reference numbers are used for the same components to avoid repeating the description.

In the above fourth and fifth embodiment as in the third embodiment, the operational efficiency of mounting the cowl unit $U_1$ to the vehicle body 1 can be improved at the same time that the supporting rigidity of the brake pedal 13 can get higher.

What is claimed is:

1. A structure of a front body of a motor vehicle having a passenger compartment with a door opening and an engine compartment separated from said passenger compartment, the structure comprising:

a vehicle body side member of a closed sectional construction extending in the widthwise direction of said vehicle body between right and left front pillars thereof, said body side member being attached to said body to interconnect said front pillars and thereby increase body rigidity around a lower edge of a front windshield of said vehicle;

a first unit provided in the front part of said vehicle body side member, said first unit having at least a cowl member and a windshield wiper system attached to said cowl member, an end part of said first unit being fixed to said vehicle body, said first unit being shaped to be inserted into said body through said engine compartment from above toward said side member;

and a second unit provided in the rear part of said vehicle body side member, said second unit having at least an instrument panel and a steering system, an end part of said second unit being fixed to said vehicle body, said second unit being shaped to be inserted into said body from the rear through said door opening toward said side member.

2. A structure of a front body of a motor vehicle as claimed in claim 1, wherein said vehicle body side member is a vehicle body side cowl member, which contacts with said cowl member of said first unit so as to compose a cowl box.

3. A structure of a front body of a motor vehicle as claimed in claim 1, wherein said first unit further comprises a brake pedal bracket, a brake pedal, and a brake multiplier system, and said second unit further compreises an air conditioning system.

4. A structure of a front body of a motor vehicle as claimed in claim 3, wherein said first unit comprises a dash member fixed on the underside of said cowl member to constitute a part of a dash panel of said vehicle body, to said dash member said brake pedal, said brake pedal bracket, and said brake multiplier system are attached.

5. A structure of a front body of a motor vehicle as claimed in claim 4, wherein said dash member is fixed to a position which corresponds to an opening on said dash panel on the underside of said cowl member and closes said opening of said dash panel to compose a part of said dash panel with being attached to the periphery of said opening by a bonding material under such a condition that said first unit is attached to said vehicle body.

6. A structure of a front body of a motor vehicle as claimed in claim 4, wherein a projecting part which projects to a passenger compartment is formed on the periphery of said dash member and step part on which a bonding material is applied between said dash member, and said dash panel is formed on the periphery of said opening of said dash panel corresponding to said projecting part.

7. A structure of a front body of a motor vehicle as claimed in claim 6, wherein said dash member and said dash panel overlaps with each other until the upper position over said projecting part of said dash member and insulators are provided in each passenger compartment side of both said dash member and said dash panel.

8. A structure of a front body of a motor vehicle as claimed in claim 3, wherein said second unit comprises an instrument panel member extending in the widthwise direction in the front of said instrument panel and supporting said steering system, both ends of said instrument panel member are placed fixedly to said vehicle body.

9. A structure of a front body of a motor vehicle as claimed in claim 8, wherein a steering shaft of said steering system is supported by said instrument panel member through a supporting member, and a lower part of said steering shaft is placed fixedly to said dash panel through a bracket.

10. A structure of a front body of a motor vehicle as claimed in claim 1, wherein a positioning portion which determines a position in the longitudinal direction by connecting with the side part of said cowl member is formed divergently and facing upwardly in said vehicle body, and the side part of said cowl member is fixed to said positioning portion through a bonding material.

11. A method of assembling a vehicle body comprising the steps of:
inserting a first unit comprising at least a cowl member and a windshield wiper system provided in said cowl member into the front of a vehicle body side member of a closed sectional construction extending in the widthwise direction of said vehicle body with connecting right and left front pillars;
mounting both side ends of said first unit to said vehicle body;
inserting a second unit comprising at least an instrument panel and a steering system from an opening of a vehicle door into a passenger compartment to be disposed in the rear of said vehicle side member of a closed sectional construction; and
mounting both side ends of said second unit to said vehicle body.

12. A method of assembling a vehicle body as claimed in claim 11, wherein a first unit is mounted to said vehicle body, said positioning portion which determines a position in the longitudinal direction by connecting the side part of said cowl member is formed divergently and facing upward in said vehicle body, side portion of said cowl member is inserted from top of said positioning portion after a bonding material is applied on said positioning portion, said side portion is positioned and fixed by said positioning portion through said bonding material at finishing inserting said side parts.

13. A method of assembling a vehicle body as claimed in claim 11, wherein said step of mounting both side ends of said first unit to a vehicle body comprises the steps of:
attaching one of two brackets composing a brake pedal bracket to said cowl member of said first unit;
connecting one end of another bracket of said two brackets to said vehicle body side member of a closed sectional construction extending in the widthwise direction of said vehicle body between right and left front pillars of said vehicle body;
inserting said first unit to the front of said vehicle body side member from the top; and
connecting said two brackets together.

14. A structure of a front body of a motor vehicle comprising:
a vehicle body side member of a closed sectional construction extending in the widthwise direction of a vehicle body between right and left front pillars of said vehicle body;
a first unit provided in the front part of said vehicle body side member, said first unit having at least a cowl member and a windshield wiper system attached to said cowl member, an end part of said first unit being fixed to said vehicle body; and
a second unit provided in the rear part of said vehicle body side member, said second unit having at least an instrument panel and a steering system, an end part of said second unit being fixed to said vehicle body; and
a brake pedal bracket and a brake pedal supported by said brake pedal bracket, said brake pedal bracket including a first bracket fixed to a lower part of said cowl member and a second bracket of which one end is connected to said first bracket and the other end is connected to said vehicle body side member.

15. A structure of a front body of a motor vehicle as claimed in claim 14, wherein said first bracket comprises a pair of right and left side wall parts facing each other with a specified distance, a supporting shaft of said brake pedal is supported therebetween, said second bracket comprises a pair of right and left stretching out parts extending downwardly and frontwardly below said cowl member, side wall parts of said first bracket are placed fixedly between right and left stretching out parts, said front body of motor vehicle is attached fixedly between said side wall parts of said first bracket and said stretching out parts of said second bracket.

16. A structure of a front body of a motor vehicle as claimed in claim 15, wherein said first unit comprises a dash member composing a part of said dash panel by being fixed into the lower part of said cowl member, said first bracket comprises an upper wall part facing to the underside of said cowl member, a pair of right and left side wall parts extending downward from both right and left side ends of said upper wall part, and a front wall part which extends downwardly from the front end of said upper wall part and butt-connected with said side wall parts, said front wall part is supported by said dash member through a spacer member.

17. A structure of a front body of a motor vehicle as claimed in claim 16, wherein said supporting shaft is composed of a tube, a bolt for tightening both said brackets pierces to the inside of said supporting shaft which is supported revolvably in said bracket around said bolts.

18. A structure of a front body of a motor vehicle as claimed in claim 15, wherein said first unit comprises a dash member composing a part of said dash panel by being fixed to the lower part of said cowl member, said first bracket comprises an upper wall part facing to the underside of said cowl member, a pair of right and left side wall parts extending downwardly from both right and left side ends of said upper wall part, and a front wall part which extends downwardly from the front end of said upper wall part and butt-connected with said side wall parts, said front wall part is supported by said dash member through a spacer member, said upper wall part is supported fixedly by an attaching plate fixed to the underside of said cowl member.

19. A structure of a front body of a motor vehicle as claimed in claim 15, wherein said first unit comprises a dash member composing a part of said dash panel by being fixed to the lower part of said cowl member, said first bracket comprises an upper wall part facing to the underside of said cowl member, a pair of right and left side wall parts each extending downwardly from right and left side ends of said upper wall part, a front wall part extending downwardly from the front end of said upper wall part and butt-connected with said each side wall part, and a pair of projecting parts which project to both right and left side ends of said upper wall part from each side wall part, said front wall part is supported by said dash member through a spacer member, said projecting parts are supported by an attaching plate fixed on the underside of said cowl member, said second bracket comprises a pair of right and left flange parts extending horizontally and outwardly in the widthwise direction of said vehicle body from the upper end of said stretching out parts, each flange part is fixed to said attaching plate together with said each projecting part so as to connect said first bracket and said second bracket.

20. A structure of a front body of a motor vehicle comprising:
a vehicle body side cowl member of a closed sectional construction extending in the widthwise direction of a vehicle body between right and left front pillars of said vehicle body, wherein said vehicle body side cowl member includes a closed sectional construction formed by an upper panel and a lower panel, said upper panel including a vertical wall part extending substantially in a vertical direction, a supporting part which extends to the rear and upward obliquely from the upper end of said vertical wall part and supports around the lower end part of a windshield, and an upper wall part extending rearwardly from the rear end of said supporting part, and said lower panel comprises a bottom wall part which extends in the longitudinal direction and is connected to the lower end of said upper panel, a vertical wall part which stands up and extends upward form the rear end of said bottom wall part, and a flange part which extends rearwardly from the upper end of said vertical wall part and is connected to said upper wall part of said upper panel;
a first unit provided in the front part of said vehicle body side member, said first unit having at least a cowl member and a windshield wiper system attached to said cowl member, an end part of said first unit being fixed to said vehicle body, said vehicle body side cowl member contacting said cowl member to form a cowl box; and
a second unit provided in the rear part of said vehicle body side member, said second unit having at least an instrument panel and a steering system, an end part of said second unit being fixed to said vehicle body.

21. A structure of a front body of a motor vehicle comprising:
a vehicle body side member of a closed sectional construction extending in the widthwise direction of a vehicle body between right and left front pillars of said vehicle body;
a first unit provided in the front part of said vehicle body side member, said first unit having at least a cowl member and a windshield wiper system attached to said cowl member, an end part of said first unit being fixed to said vehicle body, said vehicle body side cowl member contacting said cowl member to form a cowl box, said cowl member of said first unit having a front wall part extending in the vertical direction at approximately the same position as a dash panel of said vehicle body, a bottom wall part extending rearwardly from the lower end of said front wall part, and a rear wall part which extends upward from the rear end of said bottom wall part and contact a front part of said upper panel; and
a second unit provided in the rear part of said vehicle body side member, sand second unit having at least an instrument panel and a steering system, an end part of said second unit being fixed to said vehicle body.

22. A structure of a front body of a motor vehicle as claimed in claim 21, wherein both right and left ends of said unit side cowl member are fixed to said vehicle body together with a bonnet hinge which supports bonnet openably and closably.

23. A structure of a front body of a motor vehicle comprising:
a vehicle body side member of a closed sectional construction extending in the widthwise direction of a vehicle body between right and left front pillars of said vehicle body;
a first unit provided in the front part of said vehicle body side member, said first unit having a cowl member, a brake pedal bracket, a brake pedal, a brake multiplier system and a windshield wiper system attached to said cowl member, a dash member fixed on the underside of said cowl member to constitute a part of a dash panel of said vehicle body, to which said dash member said brake pedal, said brake pedal bracket, and said brake multiplier system are attached, said dash member including a projecting part which projects forwardly, said brake multiplier system being provided in an engine compartment side of said projecting part and said brake pedal being supported in a passenger compartment side of said projecting part through said brake pedal bracket which faces said projecting part of said dash member with a predetermined distance by a spacer member and which is fixed by screwing a studbolt into a nut with said studbolt piercing into said passenger compartment through said spacer member from said brake multiplier system, an end part of said first unit being placed fixedly to said vehicle body; and a second unit provided in the rear part of said vehicle body side member, said second unit having at least an instrument panel, an air conditioning system and a steering system, an end part of said second unit being placed fixedly to said vehicle body.

24. A structure of a front body of a motor vehicle as claimed in claim 23, wherein said brake pedal bracket is placed fixedly to the underside of said cowl member through said space member.

25. A structure of a front body of a motor vehicle comprising:
- a vehicle body side member of a closed sectional construction extending in the widthwise direction of a vehicle body between right and left front pillars of said vehicle body;
- a first unit provided in the front part of said vehicle body side member, said first unit having at least a cowl member and a windshield wiper system attached to said cowl member, an end part of said first unit being placed fixedly to said vehicle body; and
- a second unit provided in the rear part of said vehicle body side member, said second unit having at least an instrument panel and a steering system, an end part of said second unit being fixed to said vehicle body; and
- a positioning portion which determines a position in the longitudinal direction of said vehicle which receives a side part of said cowl member and is formed to diverge and face upwardly in said vehicle body, the side part of said cowl member being fixed to said positioning portion through a bonding material, said positioning portion including front and rear channels which extend in the vertical direction and open facing to each other having wider distance in the upper part, flange parts which engage both of said channels respectively being formed in the side part of said cowl member.

26. A structure of a front body of a motor vehicle as claimed in claim 25, wherein a trapezoid shaped step part which has a shorter bottom line than a top line is formed in a cowl side inner of said vehicle body, the rear end of a reinforcement connected to the front end of said cowl side inner extends to the front end of said step part and forms said front channel between said step part, the side end of said upper panel connected to the rear end of said cowl side inner extends to the rear end of said step part and forms said rear channel between said step part.

27. A structure of a front body of a motor vehicle as claimed in claim 25, wherein a channel part extending in the longitudinal direction over lower end of said both channels is formed in said vehicle body, a flange part formed in the side part of said cowl member is fixed to said channel part by a bonding material.

28. A structure of a front body of a motor vehicle as claimed in claim 25, wherein said cowl member is composed of a front wall part, a bottom wall part, and a rear wall part, a side part of said cowl member is formed such that said front wall part and said rear wall part open upwardly corresponding to a configulaion of said positioning portion, a cowl unit side to close an opening is provided in the side end thereon.

* * * * *